ELECTRONIC CONDUCTOR DETECTOR AND INDICATOR

Original Filed Sept. 5, 1967 2 Sheets-Sheet 1

INVENTORS.
JAMES T. HARDIN
RODGER T. LOVRENICH
BY
D Henry Stoltenberg
ATTORNEY

ELECTRONIC CONDUCTOR DETECTOR AND INDICATOR

Original Filed Sept. 5, 1967

INVENTORS.
JAMES T. HARDIN
RODGER T. LOVRENICH
BY
D Henry Stoltenberg
ATTORNEY 3,473,110
ELECTRONIC CONDUCTOR DETECTOR AND INDICATOR James Theodore Hardin, Lambertville, and Rodger Thomas Lovrenich, Temperance, Mich., assignors to Eltra Corporation, Toledo, Ohio, a corporation of New York
Continuation of application Ser. No. 665,625, Sept. 5, 1967. This application Mar. 3, 1969, Ser. No. 804,740
Int. Cl. G01r 33/12
U.S. Cl. 324—34 10 Claims

ABSTRACT OF THE DISCLOSURE

An electronic conductor detector which operates a remote indicator in response to the presence of conductive material. An inductive sensor is connected to a solid state oscillator which has an output related to the presence of a conductive material. The oscillator output operates a bistable demodulator, the two states of which indicate the presence or absence of a conductor.

CROSS REFERENCES TO RELATED APPLICATIONS

This application is a continuation of our co-pending application Ser. No. 665,625, filed Sept. 5, 1967, which is in turn a continuation in part of our co-pending applications Ser. No. 496,464 filed Oct. 15, 1965 and now U.S. Patent 3,388,267, and Ser. No. 496,477 filed Oct. 15, 1965, now abandoned.

SUMMARY OF THE INVENTION

The electronic conductor detector or proximity switch of this invention includes a solid state oscillator having an inductor included in its circuit which may be remotely positioned, through a sensing element, to detect the presence of or distance to a conductor. The amplitude of the oscillatory output of the oscillator is dependent upon the distance to a conductor from the inductive sensor. This output is detected by a bistable demodulator circuit which is connected to a relay or other indicator device such that it will actuate the relay or indicator device only when the amplitude of the oscillatory input signal from the oscillator is below a predetermined value. A regulated direct current power supply is included in the circuitry, along with an adjustable resistor which varies the set point or amplitude of oscillations at which the bistable demodulator will react to actuate the relay or other indicator device.

The sensor or inductive coil which forms a part of the oscillator circuit includes a ferrite core and winding which is designed to have a maximum ratio of sensitivity in one direction. The adjustable set point control operates to shunt the oscillating output from the oscillator, and thus vary the point at which the bistable demodulator will activate the relay. When a conductor is placed within a predetermined distance in the electromagnetic field of the sensor, induced eddy currents (and hysteresis losses in a magnetic conductor), which constitute energy losses in the closed loop of the oscillator, cause the ratio "Q" of energy stored in the sensor to the energy dissipated per cycle, to decrease. This reduction in ratio, or "Q," changes the circuit gain of the oscillator. Stable operation of the oscillator requires a circuit gain equal to or greater than unity. This unity gain condition occurs at different oscillator amplitudes, depending upon the sensor losses, or depending upon the distance to a conductor from the sensor. The result is that oscillator amplitude will increase with an increasing distance between the sensor and a conducting material. As a minimum, oscillator amplitude can be reduced to zero if the conducting material-to-sensor-spacing is made small enough. The maximum oscillator amplitude, assuming no conductor is within the detectible range of the sensor, is limited by the supply voltage. A suitable operating region in a preferred embodiment is between zero and about 18 volts, peak-to-peak.

The change is oscillator amplitude, due to variations in the proximity of a conductor to the sensor, is used to operate the bistable demodulator. The bistable demodulator, as the name indicates, has two stable states. When the applied oscillator amplitude is below a predetermined level, the oscillator remains in one of its stable states. When the amplitude is increased by a fixed amount above the predetermined level, the bistable demodulator assumes its other stable state. As previously stated, the adjustable set point control can be used to vary the point at which the bistable demodulator is triggered by shunting varying amounts of oscillator output.

The bistable demodulator is a solid state, modified "Schmitt trigger" circuit which includes a time delay RC circuit having a time constant larger than the lowest frequency of the input signal applied to the bistable demodulator. Accordingly, the output of the modified "Schmitt trigger" does not follow the oscillating input but remains in one of its stable states until the amplitude of the oscillations crosses a predetermined threshold, at which time the bistable demodulator will shift to the other of its stable conditions. The output of the bistable demodulator is amplified and is used to operate a relay or other indicator device.

The effect of different conductors, at the same distance from the sensor element, upon the amplitude of the oscillator output will vary, due to differences in hysteresis losses and eddy currents induced because of the nature of the conductor and its physical shape. Accordingly, the circuitry of this invention may be utilized to determine the distance between a known conductor of a known shape from the sensor, or the identity or shape of an unknown conductor at a known distance from the sensor. While the preferred embodiment in this application is described in terms of the detection and indicator of the distance from the sensor to a known conductor of a given shape, it is to be appreciated that the circuitry and theory of operation of this invention may be advantageously utilized in the identification of unknown conductors at a given distance, etc., as described above.

DESCRIPTION OF A PREFERRED EMBODIMENT

Figures 1, 2:
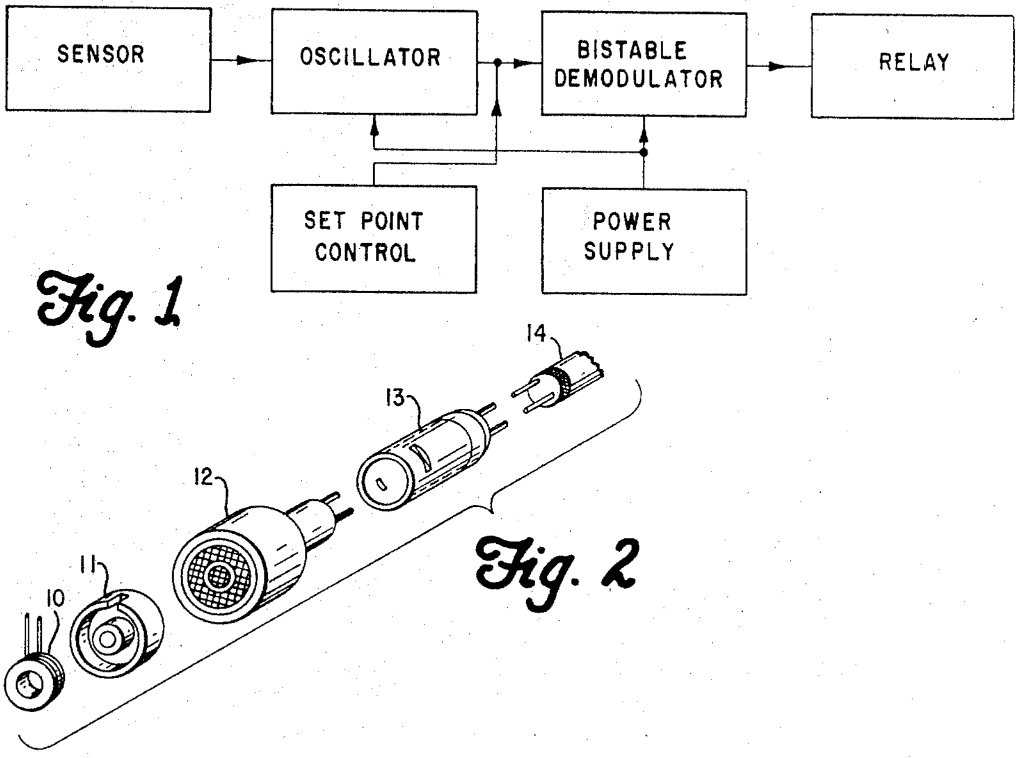
FIG. 1 is a schematic diagram of the components comprising the proximity switch of this invention, and showing, in block diagram, the oscillator, the bistable demodulator and their power supply, the relay or other indicator device actuated by the bistable demodulator, and further showing the sensor which is actually a part of the oscillator and the set point control for changing the effective impressed amplitude of the oscillatory output from the oscillator.
FIG. 2 is an exploded view in perspective of the sensor which is a part of this invention, and showing the mechanical construction of a preferred embodiment thereof.

Referring briefly to FIG. 1, as previously explained, the basic circuitry of this invention includes an oscillator and bistable demodulator which has an output controlled by the amplitude of the oscillatory input from the oscillator. The oscillator is in turn controlled by the distance between an inductive coil or sensor and any conductor within the field thereof which is effective to cause losses in the oscillator circuit due to induced eddy currents or, in the case of a magnetic material, hysteresis losses. Further, as previously explained, the schematically shown set point control in FIG. 1 is effective to vary the amplitude of the oscillations applied to the bistable demodulator so that the set point or point at which the bistable demodulator will activate the relay may be varied. Finally, the direct current power supply for the oscillator and demodulator, which is schematically shown, is preferably voltage regulated as described below.

Referring to FIG. 2, the mechanical components of the sensor include an inductive winding or coil 10 and its ferrite core 11 which are potted within a sensor housing 12. The leads from the winding 10 are electrically connected to terminals on the potted housing 12 which are received by a connector 13, the other end of which is provided with suitable terminals for connection to a shielded conductor cable 14.

As previously stated, the electromagnetic field of the sensor winding 10 is highly directional, due to the configuration of its ferrite core 11 and the housing 12 which may be stainless steel or other protective material. This configuration is resistant to the effects of surrounding magnetic fields and protects the sensor winding 10 from mechanical damage. Because the uses of the proximity switch of this invention may require that the sensor be positioned remotely from the remaining circuitry and relay or indicator, the flexible shielded cable 14 is used as the electrical connector between the sensor winding 10 and the oscillator circuit. It should be appreciated that the length of the shielded cable 14, due to the capacitive reactance inherent in such cables, may affect the set point of the oscillator circuit.

Figure 4:
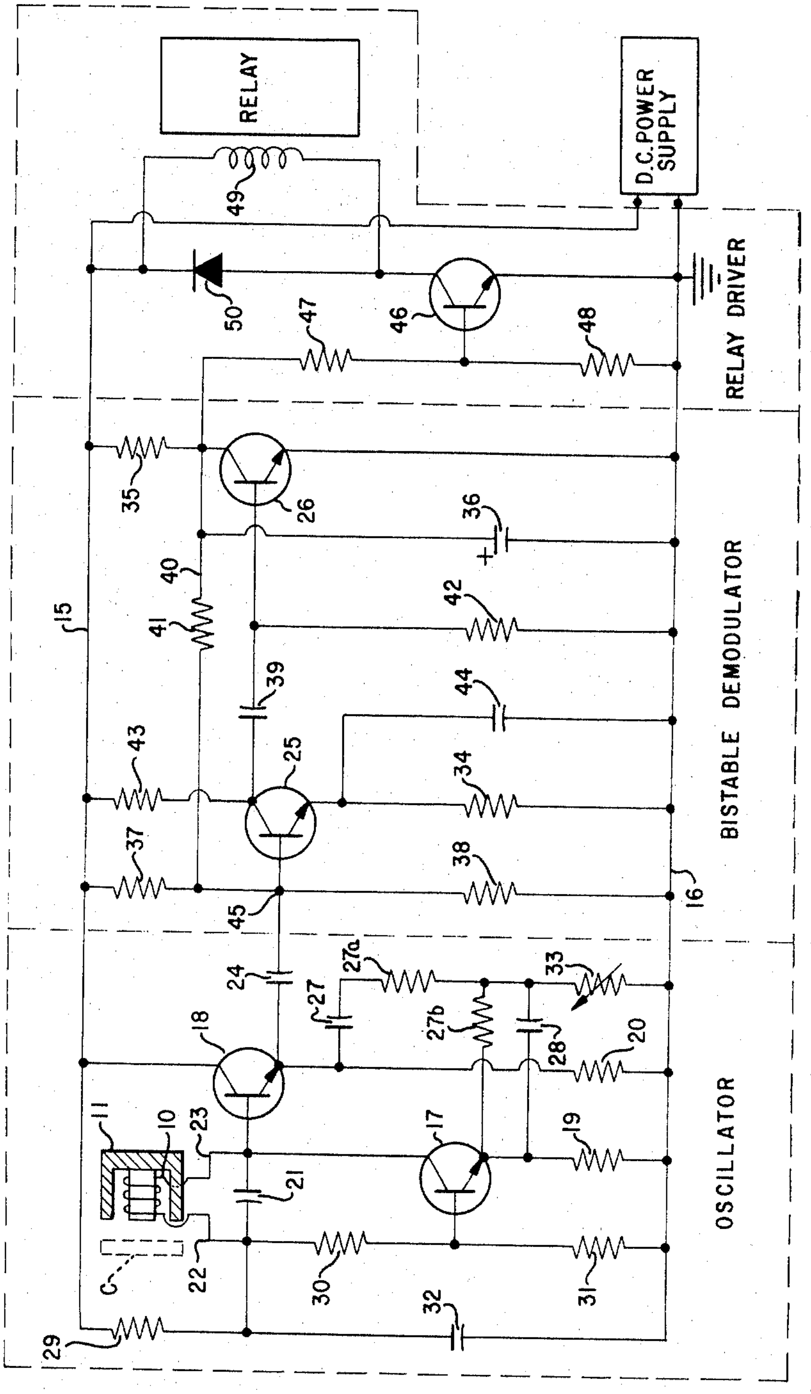
FIG. 4 is a circuit diagram of a preferred embodiment of the invention, showing in detail the circuitry for the oscillator and bistable demodulator circuits along with a driver amplifier, with the operated relay and power supply shown schematically.

Referring to the circuit diagram of a preferred embodiment of the invention, FIG. 4 shows both the oscillator and bistable demodulator circuits connected to a common pair of lines 15 and 16 which are directly connected to a direct current power supply. The power supply may include an AC to DC rectifier and should include a voltage regulation device, such as a Zener diode, to assure a fairly constant voltage between the lines 15 and 16.

Referring to the oscillator circuit, a pair of NPN transistors 17 and 18 are connected across the lines 15 and 16 with resistors 19 and 20 connected between their emitters and the line 16 to provide proper DC bias. The collector circuit of the transistor 17 includes a parallel resonant LC circuit including a capacitor 21 and the winding 10 of the sensor which, as schematically indicated, is wound upon the ferrite core 11. In this FIGURE 4, the shielded cable 14 would correspond to the lines 22 and 23. The base of the transistor 18 is connected to the collector of the transistor 17 and the emitter of the transistor 18 is connected to the emitter of the transistor 17 to form a positive feedback circuit where transistor 18 is an emitter follower and the transistor 17 is employed in essentially a common base configuration. The emitter of the transistor 18 is connected through a capacitor 24 to the base of an NPN type transistor 25 which, with another NPN type transistor 26, are included in the bistable demodulator circuit, the operation of which will be subsequently described. The emitters of the transistors 17 and 18 are connected through a capacitor 27 and resistors **27*a* and 27*b* with a capacitor 28 in parallel with the resistor 27*b*. Three voltage dividing resistors 29–31 extend between the lines 15 and 16 and a capacitor 32 is connected in parallel with the voltage dividing resistors 30 and 31. Finally, an adjustable resistor or potentiometer 33, which functions as the "set point" control, is connected in the emitter to emitter circuit between the resistors 27*a* and 27*b* and the line 16** or ground.

Th two-transistor oscillator circuit previously described will oscillate only at the resonant frequency of the parallel LC circuit including the sensor winding 10 and capacitor 21 when the ratio of energy stored in this resonant circuit to the energy dissipated, for a given time, is above a predetermined value. This ratio, "Q," must be of a value high enough so that the gain of the oscillator closed loop* is equal to or larger than unity.

The proximity of any conductor, such as that schematically indicated in FIG. 4 and designated by reference numeral C, to the sensor winding 10 will change the ratio "Q" and thus will affect the amplitude of the oscillations of the oscillator circuit. The presence of a conductor within the electromagnetic field of the sensor winding 10 will introduce additional losses, due to eddy currents in the conductor and, in the case of magnetic materials, due to hysteresis. As a conductor C approaches the sensor winding 10, the ratio of energy stored to energy dissipated, "Q," will decrease to thus lower the forward loop gain of the oscillator circuit. The amplitude of the oscillations will diminish as the conductor C approaches the sensor winding 10 and oscillations will finally cease when the conductor has approached the sensor winding 10 to the point at which the total loop gain drops below unity. If the conductor C is again moved away from the sensor winding 10 far enough to raise the oscillator loop gain above unity, the oscillations will resume. Stated another way, in order for the oscillator to oscillate, the closed loop gain of the oscillator circuit must be unity or larger, thus the total impedance of the collector circuit of the transistor 17 must equal or exceed the effective resistance of the resistors **27*a* and 27*b*, plus the reflected resistance at the emitter of the transistor 17 through the capacitor 28. The value of the resistors 27*a* and 27*b* is selected such that variations in the "Q" of the parallel resonant circuit including the capacitor 21 in the sensor winding 10, due to variations in the proximity of a conductor C, will vary the tuned effective resistance of this LC circuit relative to the fixed value of the resistors 27*a* and 27*b* and the effective emitter resistance of the transistor 17 so that the amplitude of the oscillations will approach zero and the oscillations will cease when the conductor C very closely approaches the sensor winding 10. Thus, at one extreme position, the oscillations cease due to the nearness of the conductor C to the sensor winding 10, and, at the other extreme, with no conductor within the electromagnetic field of the sensor winding 10**, the amplitude of the oscillations is limited only by the voltage of the DC power supply.

Figure 3:
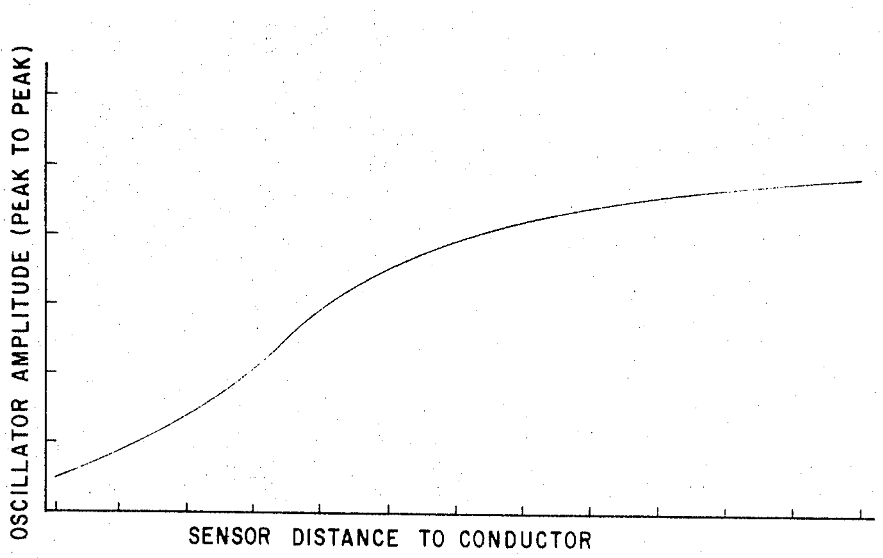
FIG. 3 is a graphical example of the variation in oscillator amplitude versus distance from a given conductor to the sensor for the oscillator circuit shown in FIG. 4 and described as the preferred embodiment below.

FIG. 3 graphically shows the relationship between the oscillator amplitude and the distance from the sensor winding 10 to a conductor. As indicated in FIG. 3, the amplitude of oscillations, expressed in peak-to-peak voltages, increases as the distance from a given conductor to the sensor winding 10 increases. Different conductors and conductors of various shapes will have a different effect upon the oscillator amplitude and the curve shown in FIG. 3 is to be considered only as exemplary of the oscillator output relationship to a given conductor.

It will be appreciated that various modifications in the described preferred emobdiment of the oscillator circuit may be made without departing from the scope of the invention. For instance, the parallel resonant circuit, including the sensor winding 10 and the capacitor 23, may be used in positive or negative feedback loops of transistorized oscillator circuits, but it has been determined that the LC circuit has the highest "Q" when positioned in the collector or output circuit of the transistor 17, as described in the preferred embodiment above.

---

*Expressed in terms of current gain, A, $A=\Delta i_1/\Delta i_2$, where $\Delta i_1$ represents current at the emitter of the transistor 17 and $\Delta i_2$ represents the feedback current to the emitter of transistor 17 from the transistor 18.

In the bistable demodulator circuit, the pair of NPN transistors 25 and 26 are connected across the lines 15 and 16 with a resistor 34 connected between the emitter of the transistor 25 and the line 16. These transistors 25 and 26, as previously explained, form a modified "Schmitt trigger" circuit with the addition of an RC time delay circuit including a resistor 35 and a capacitor 36 connected across the lines 15 and 16 in series with the collector of the transistor 26. The base of transistor 25 is connected between a pair of voltage dividing resistors 37 and 38, and the collector of the transistor 25 is connected to the base of the transistor 26 through a capacitor 39. The collector of the transistor 26 is connected by a line 40 through a resistor 41 to the base of the transistor 25, and the base of the transistor 26 is connected to the ground line 16 through the resistor 42. Finally, a resistor 43 is connected between the line 15 and the collector of the transistor 25, and a capacitor 44 is connected between the emitter of the transistor 25 and the line 16. The value of the resistor 43 is selected so that the transistor 25 is biased in a stable state of conduction when no input signal is being applied at its base, or at the junction 45 from the oscillator circuit.

The output of the transistor 25 is applied to the base of the transistor 26 and holds this transistor 26 in a non-conducting or turned-off condition. When the transistor 26 is turned off, the capacitor 36 is charged through the resistors 35 and 37 to an initial energy level, with polarity as indicated in FIG. 4.

When an input or triggering oscillatory signal is applied to the base of the transistor 25, the transistor 25 is rendered non-conductive which, in turn, renders the transistor 26 conductive. When the transistor 26 starts to conduct, the energy stored in the capacitor 36 is immediately dissipated and the voltage applied to the base of an amplifying transistor 46 is reduced to the point where this transistor 46 is turned off. A voltage dividing network including resistors 47 and 48 further reduces the voltage at the base of the amplifying transistor 46.

While a "Schmitt trigger" circuit, including the two transistors 25 and 26, would normally be expected to follow the oscillating input applied to the base of the transistor 25, it is prevented from doing so by the time constant of the RC circuit, including the resistor 35 and the capacitor 36 which are connected in series between the lines 15 and 16 with the collector of the transistor 26. This RC circuit prevents the complete recovery of the collector voltage of the transistor 26. Due to the high frequency of the input signal applied to the base of the transistor 25, relative to the time constant of the RC circuit including the resistor 35 and the capacitor 36, there is insufficient time available to substantially charge the capacitor 36 to its initial high energy level. Therefore, the energy discharged from this capacitor 36, after the initial discharge when the transistor 26 begins to conduct, is very low, as long as continuing oscillations are applied to the base of the transistor 25. Thus, the signal at the collector of the transistor 26, and at the base of the amplifying transistor 46, is very small or nonexistent when there is an oscillatory signal of sufficient amplitude being applied to the base of the transistor 25.

When the input oscillations applied to the base of the transistor 25 drop below the predetermined value, the charge on the capacitor 36 again accumulates to a substantial value, and remains in that condition until further conduction by the transistor 26. Thus, when there is no output signal from the bistable demodulator, there is an oscillating input signal whose period is shorter than the time constant of the RC circuit. When this relatively high frequency input signal drops below the predetermined value, the transistor 25 turns on which in turn turns off the transistor 26 to effectively apply a maximum signal to the amplifying transistor 46.

The above described bistable demodulator is effective to indicate, by a relatively large output signal, the absence of an oscillating signal above a predetermined amplitude impressed upon its input terminal or junction 45. It also indicates, by the absence of any appreciable output signal, that an oscillating signal above the predetermined amplitude is being applied to the input terminal or junction 45. The amplitude of the applied oscillatory signal from the oscillator circuit is proportional to the distance between a conductor and the sensor winding 10. Finally, through the potentiometer 33, the range or amplitude at which the bistable demodulator will effectively shift its state of operation may be varied.

Connected in series between the lines 15 and 16, and in the emitter-collector circuit of the amplifying transistor 46, is the winding 49 of the relay operated by the proximity switch of this invention. A diode 50 is connected across the relay winding 49 to clamp the voltage therefrom to protect the amplifying transistor 46. As previously stated, in place of the relay and its winding 49, some other indicator device such as a warning light, etc., may be used as desired. Thus, actuation of the relay or other warning device will indicate to the operator the presence of a conductor C within a given distance from the sensor winding 10.

We claim:

1. Apparatus for detecting and indicating the presence of an electrically conductive object, comprising, in combination, a direct current power supply, a solid state oscillator circuit including an inductive sensor element remotely positioned therefrom, said oscillator operatively connected to said power supply such that the amplitude of its output reaches a maximum in the absence of an electrical conductor within the electromagnetic field of said inductive sensor element and decreases below a predetermined value as an electrical conductor approaches said sensor element due to increased energy dissipation by such conductor, a bistable demodulator circuit including a pair of transistors having emitter, collector and control electrodes, the first of said transistors operatively biased across said power supply with its control electrode connected to the output of said oscillator whereby said first transistor is non-conducting only when the amplitude of said oscillator output exceeds said predetermined value, the second of said transistors biased across said power supply with its control electrode operatively connected to the output of said first transistor whereby said second transistor will conduct only when said first transistor is non-conducting, an indicator device operatively connected to the output of said second transistor, a capacitor operatively connected to the output of said second transistor whereby said capacitor will be charged to an initial high energy level to activate said indicator device when said second transistor is nonconducting and whereby the energy stored therein will be discharged when the amplitude of said oscillator output exceeds said predetermined value.

2. Apparatus for detecting and indicating the presence of an electrically conductive object, comprising, in combination, a direct current power supply, a solid state oscillator circuit including an inductive sensor element remotely positioned therefrom, said oscillator operatively connected to said power supply such that the amplitude of its output reaches a maximum in the absence of an electrical conductor within the electromagnetic field of said inductive sensor element and decreases below a predetermined value as an electrical conductor approaches said sensor element due to increased energy dissipation by such conductor, a bistable demodulator circuit including a pair of transistors with their emitter-collector circuits connected across asid power supply, means connecting the output of said oscillator to the control electrode of the first of said transistors, means connecting the collector of said first transistor to the control electrode of the second of said transistors, an indicator device operatively connected to the collector of said second transistor, means biasing said transistors so that said first transistor is non-conducting when the amplitude of the oscillatory signal applied to its control electrode exceeds said predetermined value and so that said second transistor is non-conducting when said first transistor is conducting, an RC time delay circuit including a capacitor operatively connected to the collector of said second transistor, said indicator device and said power supply whereby said capacitor is substantially charged while said second transistor is non-conducting and is substantially discharged when said second transistor is initially turned on when the amplitude of the oscillatory signal at the control electrode of said first transistor exceeds said predetermined value to stop conduction by said first transistor and thus initiate conduction by said second transistor.

3. The apparatus of claim 2 wherein the time constant of said RC circuit including said capacitor is longer than the period of the oscillatory output signal from said oscillator whereby said capacitor cannot become substantially charged when an input signal above said predetermined value is present at the control electrode of said first transistor and whereby the energy discharged to said indicator device is substantially less than the energy initially discharged from said capacitor when such input signal is initially applied to the control electrode of said first transistor.

4. An apparatus for detecting and indicating the presence of an electrically conductive object, comprising, in combination, an inductive sensing coil and a capacitor operatively connected to form a parallel resonant circuit, an oscillator circuit operatively connected to a power supply and to said resonant circuit such that variations in the distance between said sensing coil and an electrically conductive object will change the effective impedance of said parallel resonant circuit to cause variations in the amplitude of said oscillator output, and a demodulator circuit having input terminals operatively connected to said oscillator output and output terminals connected to an output indicator, said demodulator circuit including a first transistor operatively connected to said power supply with its control electrode connected to said input terminals and biased such that said first transistor is conductive when the amplitude of the oscillator output is below a predetermined value, a second transistor across said power supply with its control electrode operatively connected to the output of said first transistor and biased such that said second transistor will conduct only when said first transistor is non-conducting, an RC circuit including a capacitor operatively connected to said demodulator output terminals, whereby said capacitor will be charged to actuate said output indicator when said second transistor is non-conducting, and whereby the energy stored therein will be discharged when the amplitude of said oscillator output exceeds said predetermined value, turning off said first transistor and thus turning on said second transistor.

5. The apparatus of claim 4 wherein the time constant of said RC circuit is longer than the period of the oscillator output whereby said capacitor does not become substantially charged during periods when the oscillator output is above said predetermined value, and whereby the energy discharged to said output indicator from said capacitor is substantially less than the energy initially discharged from said capacitor when an oscillator output above said predetermined value is initially applied to the control electrode of said first transistor.

6. The apparatus of claim 4 wherein said parallel resonant circuit has an effective impedance, when an electrically conductive object is within a predetermined distance from said sensing coil, that the gain of said oscillator circuit falls below unity and its oscillations cease.

7. The apparatus of claim 6 wherein said oscillator circuit includes a pair of transistors having emitter, collector, and control electrodes with the collector of the first transistor operatively connected to the control electrode of the second transistor and the emitter of said second transistor operatively connected to the emitter of said first transistor to form a closed loop and with the parallel resonant circuit including the sensing coil connecting the collector and control electrode of said first transistor.

8. Apparatus for detecting and indicating the presence of an electrically conductive object, comprising, in combination, a direct current power supply, a solid state oscillator circuit including an inductive sensor element remotely positioned therefrom, said oscillator operatively connected to said power supply such that the amplitude of its output reaches a maximum in the absence of an electrical conductor within the electromagnetic field of said inductive sensor element and decreases below a predetermined value as an electrical conductor approaches said sensor element due to increased energy dissipation by such conductor, a bistable demodulator circuit including a pair of transistors having emitter, collector and control electrodes, each of said transistors having first and second states of conduction, means connecting the control electrode of the first of said transistors to the output of said oscillator, bias means operatively connecting said first transistor across said power supply whereby said first transistor is in the first of said states of conduction when the amplitude of oscillator output exceeds said predetermined value and whereby said first transistor is in the second of said states of conduction when the amplitude of said oscillator output falls below said predetermined value, means connecting the control electrode of the second of said transistors to the output of said first transistor, bias means operatively connecting said second transistor across said power supply whereby said second transistor will be in said second state of conduction only when said first transistor is in said first state of conduction, said demodulator having a time delay means for preventing said first and second transistors from changing their states of conduction during the time the amplitude of the output of said oscillator exceeds said predetermined value, and an indicator device operatively connected to the output of said second transistor.

9. Apparatus for detecting and indicating the presence of an electrically conductive object, as defined in claim 8, wherein said time delay means comprises an RC time delay circuit operatively connected to the collector of said second transistor.

10. Apparatus for detecting and indicating the presence of an electrically conductive object, as defined in claim 8, wherein said first and second transistors are conducting when in said second state of conduction and non-conducting when in said first state of conduction.

References Cited

UNITED STATES PATENTS

| | | | |
|---|---|---|---|
| 2,917,732 | 12/1959 | Chase et al. | 324—41 XR |
| 3,170,113 | 2/1965 | Harmon | 324—37 |
| 3,205,352 | 9/1965 | Prucha. | |

ALFRED E. SMITH, Primary Examiner

U.S. Cl. X.R.

324—40; 340—38, 258

Disclaimer 3,473,110.—*James Theodore Hardin*, *Lambertville*, and *Rodger Thomas Lovrenich*, Temperance, Mich. ELECTRONIC CONDUCTOR DETECTOR AND INDICATOR. Patent dated Oct. 14, 1969. Disclaimer filed July 25, 1969, by the assignee *Eltra Corporation*.

Hereby disclaims the portion of the term of the patent subsequent to June 11, 1985.

[*Official Gazette November 9, 1971.*]